United States Patent

[11] 3,596,106

[72] Inventor William J. Raddi
 Philadelphia, Pa.
[21] Appl. No. 816,620
[22] Filed Apr. 16, 1969
[45] Patented July 27, 1971
[73] Assignee ESB Incorporated

[54] SOLID-STATE EMERGENCY POWER SUPPLY
 14 Claims, 2 Drawing Figs.
[52] U.S. Cl. .................................................. 307/66
[51] Int. Cl. .................................................. H02j 9/00
[50] Field of Search ......................................... 307/66, 64,
 85, 86, 87, 82, 84, 57, 43, 46, 48, 49, 50, 51;
 320/2, 3, 6, 29, 30

[56] References Cited
 UNITED STATES PATENTS
3,339,081 8/1967 Borden et al. ................ 307/66
3,387,141 6/1968 Howald ........................ 307/66

Primary Examiner—Robert K. Schaefer
Assistant Examiner—H. J. Hohauser
Attorneys—Alfred J. Snyder, Jr., Robert H. Robinson,
 Raymond L. Balfour and Joseph M. Corr ABSTRACT: An emergency power supply is described comprising a switch and a low-level dropout circuit. The switch comprises a power transistor which provides power to the load from the battery and is driven by an amplifier. The low-level dropout supply circuit is a complementary bistable multivibrator which turns the switch off in going from a "conductive" state to a "nonconductive" state when the battery voltage drops to a predetermined level. There is also provided a delay-on timer which keeps the emergency lamp on for a selected period of time after external power restoration. In addition, a solid-state charger is provided to maintain a properly charged battery.

INVENTOR.
William J. Raddi

INVENTOR.
William J. Raddi 3,596,106

1

SOLID-STATE EMERGENCY POWER SUPPLY

BACKGROUND OF THE INVENTION

Emergency supply units having storage batteries as their sources of energy have been used for supplying electrical energy during periods of power failure as a result of storms or fires or other causes. One such unit is an emergency lighting system which provides light for hallways and other passageways in buildings when there has been a loss of power supply and the building lights are no longer working.

A conventional circuit for such power supplies uses a sealed mercury relay switch whereby a coil is energized by the AC power and holds a cylinder in position above a pool of mercury. Upon failure of the AC source, the coil is no longer energized and the cylinder drops into the pool of mercury causing the level of mercury to rise and make contact to complete the circuit to the battery to turn on the emergency light. Some disadvantages of such a circuit include the fact that the mercury switch is expensive, takes up space and a vibration noise occurs when the cylinder is in the pool of mercury.

The conventional circuit does not have a means for deenergizing the circuit when the potential of the battery drops to a low level. Instead, the conventional circuit permits the battery to discharge below a proper depth and eventually insufficient energy is being supplied to the lamp to light it with any degree of illumination. Also, a continued overdischarge can do great harm to the battery.

This invention provides a fully solid-state circuit which overcomes the above disadvantages of the conventional circuit and provides a reliable means for supplying power in cases of emergency.

SUMMARY OF THE INVENTION

The primary purpose of this invention is to provide a solid-state circuit for power supply systems such as emergency lighting systems wherein the circuit is inexpensive, compact, and reliable in operation.

This invention provides a switch comprising three transistors, two of which are connected to each other as a darlington amplifier which is coupled to a third power transistor which is connected between a battery and a load. The circuit of this invention further achieves the object of having a means for automatically turning off the emergency power supply when the battery voltage has dropped to a certain level and thereby protect the battery from being discharged too deeply. By automatically turning off the emergency power supply when the battery voltage has dropped to a certain level, the circuit of the invention assures that the power loss from the battery is not too great and that recharging can be accomplished over relatively short periods of time.

It is an additional object of this invention to provide a circuit for an emergency lighting system in which the lamp is automatically turned on when the external power supply fails and is automatically turned off when the external power supply is restored or when the battery potential has dropped to a certain value. This circuit provides a low-level dropout feature wherein once the battery potential decreases a certain amount, the lamp will not go on again until the circuit has been reset to a conductive state by the external source of power. It is an object of the invention to provide that the dropout circuit will not be reset by the battery alone but by the external power source only.

It is another object of this invention to provide a third feature which can readily be incorporated into the emergency power supply circuit of this invention. This third feature is a delay on timer circuit which delays the signal for turning off the circuit from appearing at the input of the switch for a period of time after restoration of external power. This subcircuit therefore is useful in those applications such as emergency lighting circuits wherein it is desired to keep the emergency lights on for a period of time while the main lights, such as mercury vapor lights, are being energized by the external power supply.

2

A solid-state charger is also provided for accurately monitoring the battery charge and for maintaining the battery at the proper charge level.

DESCRIPTION OF THE PREFERRED EMBODIMENTS

This invention provides a reliable solid-state circuit for use in emergency power supply units such as emergency lighting systems. The circuit basically comprises a switch to turn the lamp on and off together with a bistable multivibrator low-level drop out circuit which causes the lamp to turn off when the battery potential has dropped to a predetermined level. An alternate form of the circuit includes a delay-on timer which is made up of solid-state components and which keeps the lamp on for a period of time after restoration of the external power supply. This delay on timer is useful in those situations where a period of time is required to turn on the building lights after restoration of power. For example, in those instances having mercury vapor lights, which require a warmup period, this delay-on timer feature of this circuit can be useful. In both forms of the circuit, there is provided a solid-state charger for charging the battery. Although the following discussion will specifically relate to an emergency lighting system it is not intended to limit the invention to such applications since it can be used in a variety of emergency power systems.

Figure 1:
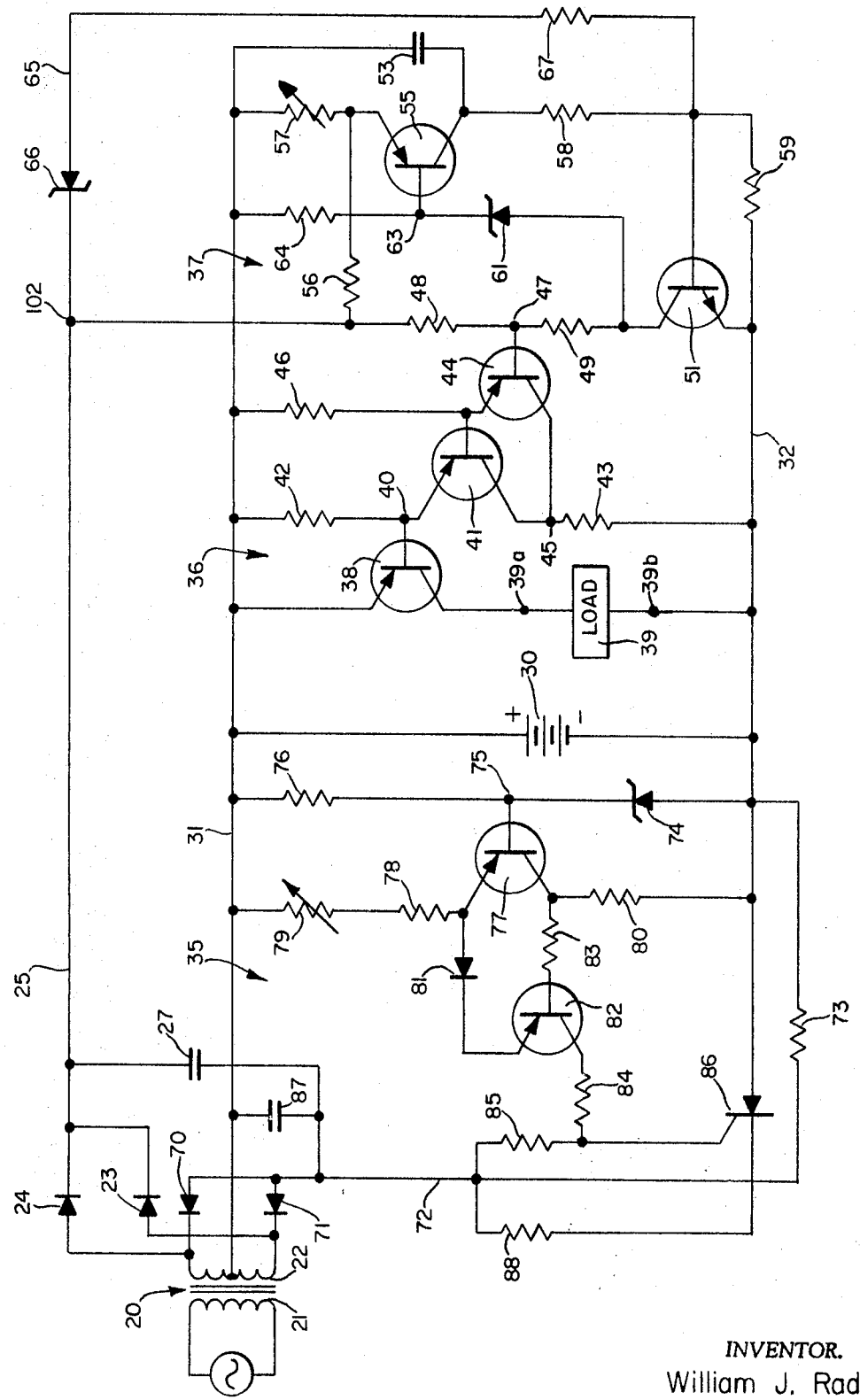
FIG. 1 is a schematic of one form of the circuit of this invention.

Turning to FIG. 1, there is shown a preferred embodiment of the circuit of this invention. A stepdown transformer 20 has a primary winding 21 connected to an AC power source and a secondary winding 22 having a pair of output terminals and a center tap. The output of the secondary transformer is rectified through diodes 23 and 24 which have a common output line 25. A filtering capacitor is shown at 27. A battery 30 is shown having its positive terminal connected to common bus line 31 and its negative terminal connected to the other common conductor 32. The charge controller which continually monitors and charges the battery is shown as 35 and is connected across the battery and to the AC power source.

As noted previously, the invention comprises a basic switch circuit, shown generally at 36, combined with a low-level dropout circuit, generally designated as 37, wherein the basic switch circuit comprises an amplifier coupled to a power transistor for supplying current to the lamp. Therefore, there is shown a PNP power transistor 38 having an emitter, base and collector. The emitter of this transistor is connected to the common busline 31 while the collector is connected to the other common conductor 32 through the load 39 which is connected to output terminals 39a and 39b which in this instance is a lamp. The base of the transistor 38 is connected to a common point 40 to which is connected to the emitter of a PNP transistor 41. A resistor 42 is connected between the common point 40, and the busline 31. The collector of transistor 41 is connected to the other conductor line 32 through resistor 43. Transistor 41 is coupled to a third PNP transistor 44 wherein the base of transistor 41 is directly connected to the emitter of transistor 44 and the collector of transistor 44 is connected to the collector or transistor 41 at the junction of point 45. The transistors 41 and 44 therefore form an amplifier of the darlington type. The emitter of transistor 44 is connected to the common busline 31 through a resistor 46. The base of transistor 44 is tied to juncture joint 47 between resistors 48 and 49. Resistor 48 in turn is connected to the rectifier output line 25 while resistor 49 is connected to the collector of transistor 51. This latter transistor forms part of the dropout circuit and will be discussed subsequently.

For the moment we will forget the presence of the low-level dropout circuit and assume that transistor 51 is conducting so that resistor 49 is shorted to common line 32, and describe the operation of the switch. This description will begin at the point of time just after the source of AC power has failed. At this point, the resistor 48 is effectively connected to the positive terminal of the battery since the potential difference between the positive terminal and the point at which 48 is connected to the output line 25 of the rectifier is zero. As a result, current begins to flow through resistors 48 and 49 whereby 49 biases the emitter-base junction of transistor 44 causing that transistor to conduct. When transistor 44 conducts, this acts to bias the base of transistor 41 and that transistor also conducts because transistors 44 and 41 are connected in darlington amplifier fashion.

Because of this conduction and low loss across the transistor pair of 41 and 44 resistor 43 is effectively connected directly to the base of transistor 38. Resistor 43 is so selected as to bias the base of transistor 38 and as a result the power transistor conducts to supply energy from the battery to the load. Upon resumption of the AC source of power, the lamps are extinguished due to the positive voltage which is applied across the resistor 48 resulting in a reverse bias current through this resistor overcoming the forward bias current of resistor 49. This reverse bias current turns off transistor 44 which turns off transistor 41 and in the end turns off transistor 38. Therefore, when the AC power is on, the current in line 25 biases the switch off and when AC power is lost the switch is biased on.

The effect of the bistable multivibrator dropout circuit 37 on the operation of the switch will now be discussed. This circuit basically comprises a pair of transistors regeneratively coupled and having a zener diode in the feedback path. Thus there is shown a PNP transistor 55 having its emitter connected to the output line 25 of the rectifier through resistor 56. The emitter is also connected to the common busline 31 through resistor 57. The collector of transistor 55 is connected through resistor 58 to the junction 60. Also tied to this junction is the base of NPN transistor 51 and bleed resistor 59 which in turn is connected to the common busline 32. The collector of transistor 51 is connected through zener diode 61 to the base of the transistor 55 at point 63 which in turn is connected through resistor 64 to the busline 31. Transistor 51 has its emitter connected directly to the common line 32. Damping capacitor 53 is connected across transistor 55 as shown in order to dampen any transient, sporadic line pulses. This bistable multivibrator dropout circuit is capable of existing in two stable states, one referred to as the conductive state and the other as the nonconductive state, and is used to protect the battery from overdischarging. The dropout level of this circuit is governed by the characteristic voltage of zener diode 61.

The dropout circuit exists in the conductive state whenever the AC power source is on, or when the power source is off and the battery voltage has not dropped to the level determined by the characteristic voltage of the zener diode in the feedback path of this circuit. Once the battery voltage has dropped to the lower potential the bistable circuit switches to a nonconductive state and turns the switch off thereby extinguishing the lamp. The bistable multivibrator does not return to the conductive state until the AC power is restored. Therefore, once the battery voltage has dropped to the selected voltage the battery is disconnected from the load and even if its voltage may recover and rise to its higher value, the dropout circuit will not become conductive and therefore the basic switch will be unable to turn on the lamp. It is the AC power source that sets the bistable circuit in a conductive state and it remains in the conductive state so long as the AC power is on or so long as the battery potential remains above the predetermined dropout potential. However, once the bistable circuit switches to the nonconductive state, the battery is unable along to reset the circuit to the conductive state.

The bistable circuit is reset to its conductive state by a triggering positive current supplied from the rectifier to the emitter of transistor 55 via resistor 56. This current is sufficient to forward bias the transistor 55 causing an emitter-base current and consequently an emitter-collector current to flow through the transistor. The emitter-collector current of transistor 55 flowing through resistor 58 acts as a base bias on transistor 51. The resistor 59 is a bleed resistor for turning off transistor 51. Since the two transistors are regeneratively connected, their currents rapidly build up to saturation. The small current that is fed into the common conductor line 32 is eventually returned through the charge controller 35 to the rectifier transformer 20. The bistable circuit is capable of being reset to its conductive state by the AC source regardless of the battery potential. This is helped by connecting zener diode 66 and resistor 67 in series between the rectifier output line 25 and the juncture point 60. The zener diode 66 is selected so that it will pass current only upon restoration of the AC power source. It should be noted that both resistor 56 and the branch line 65 of zener diode 66 and resistor 67 serve to reset the bistable multivibrator 37. With the proper choice of elements, either resistor 56 or the branch line 65 could be used alone as the resetting mechanism and could reset the bistable circuit upon AC power restoration regardless of the battery potential. However, in some instances it has been found best to use the resistor 56 and the branch line 65 in combination to assure reliability and therefore they are illustrated together in the Figure.

Considering now a situation where the AC source has been off for a period of time and the battery potential has begun to drop, it will be discussed how the dropout circuit assumes the nonconductive state and protects the battery against damage from being overcharged. As pointed out earlier, the choice of the zener diode 61 determines at what potential this dropout circuit will assume the nonconductive state since the bulk of the potential drop in this circuit is across the zener diode. Thus as the battery potential drops to a low level, the potential across resistor 57 is reduced to the point where insufficient current is supplied to the base of transistor 51 and that transistor ceases to conduct. This in turn rapidly causes transistor 55 to turn off so that the dropout circuit assumes the nonconductive state and extinguishes the lamp by causing the switch 36 to turn off. Since the zener diode 61 is in the feedback path of the bistable circuit, it accelerates the action of turning off the bistable circuit. Since resistor 57 determines the current through transistor 55 and consequently the bias current to the base of transistor 51, this resistor can be varied to adjust to actual dropout level within a narrow voltage range centered around the potential determined by zener diode 61.

It is a property of electric storage batteries such as lead-acid batteries that after they have been removed from the circuit for a period of time, the potential will rise again, Therefore, after the bistable circuit has assumed the nonconductive state, the battery will eventually rise to its higher value. The bistable circuit however remains nonconductive since point 63 assumes the potential of the battery positive terminal and acts as a reverse bias on the base of transistor 55. Resistor 64 serves as a bleed resistor to prevent thermal runaway of transistor 55. It is only after the AC power is restored that sufficient bias is supplied via resistor 56 to the emitter-base junction of transistor 55 that the bistable circuit reverts to the conductive state. Also branch line 65 supplied a bias current to the base of transistor 51 to assure resetting of the bistable circuits. As noted previously, either resistor 56 or branch line 65 alone could serve as the resetting mechanism.

The charge controller circuit 35 is used for monitoring and maintaining the proper charge on the battery 30. The charge controller has a pair of diodes 70, 71 each having its cathode connected to a terminal of the transformer 20. Each diode has its anode tied to the lead 72 which forms part of a loop having resistor 73, zener diode 74 and resistor 76 and terminating on the common busline 31. Tied into this loop at point 75 is the base of PNP transistor 77 which has its emitter connected to the bus line 31 through resistor 78 and variable resistor 79. The collector of transistor 77 is tied to common conductor 32 by resistor 80. When the AC power is on a trickle charge on the battery is maintained through trickle resistor 73. The emitter of transistor 77 is connected through diode 81 to the emitter of a PNP transistor 82 while the collector of transistor 77 is connected to the base of transistor 82 by resistor 83, thereby forming a Schmitt-trigger. The collector of transistor 82 is connected to line 72 through resistors 84 and 85 and the gate of the silicon controlled rectifier (SCR) 86 is connected to the line joining resistors 84 and 85. The SCR is positioned in common conductor 32 with its anode connected to the negative terminal of the battery and its cathode connected to line 72 through high rate resistor 88 which governs the high rate battery charging current.

In operation, a trickle charge is maintained on battery 30 through resistor 73 and while the battery potential is in a charged condition, the resistor 76 biases the base of transistor 77 to cause that transistor to conduct. When the battery potential drops, the potential drop across resistor 76 decreases until a point is reached where the potential at point 75 on the base of transistor 77 more nearly approximates the potential of the emitter of that transistor. This causes transistor 79 to cease conducting. Zener diode 74 acts as a reference potential to permit resistor 76 to be the control on transistor 77.

When transistor 77 ceases to conduct, this triggers transistor 82 to conduct and current flows through resistors 84 and 85. The voltage drop across resistor 85 is applied to the gate of SCR 86 which is triggered to conduct and high rate charging current is supplied to the battery. Resistor 88 controls the high rate charging current.

When the battery voltage rises, resistor 76 senses the increase in potential and the base of transistor 77 is biased to cause that transistor to conduct. Transistor 82 is then turned off which causes SCR 86 to cease conducting and the trickle charge is again applied to the battery 30.

Figure 2:
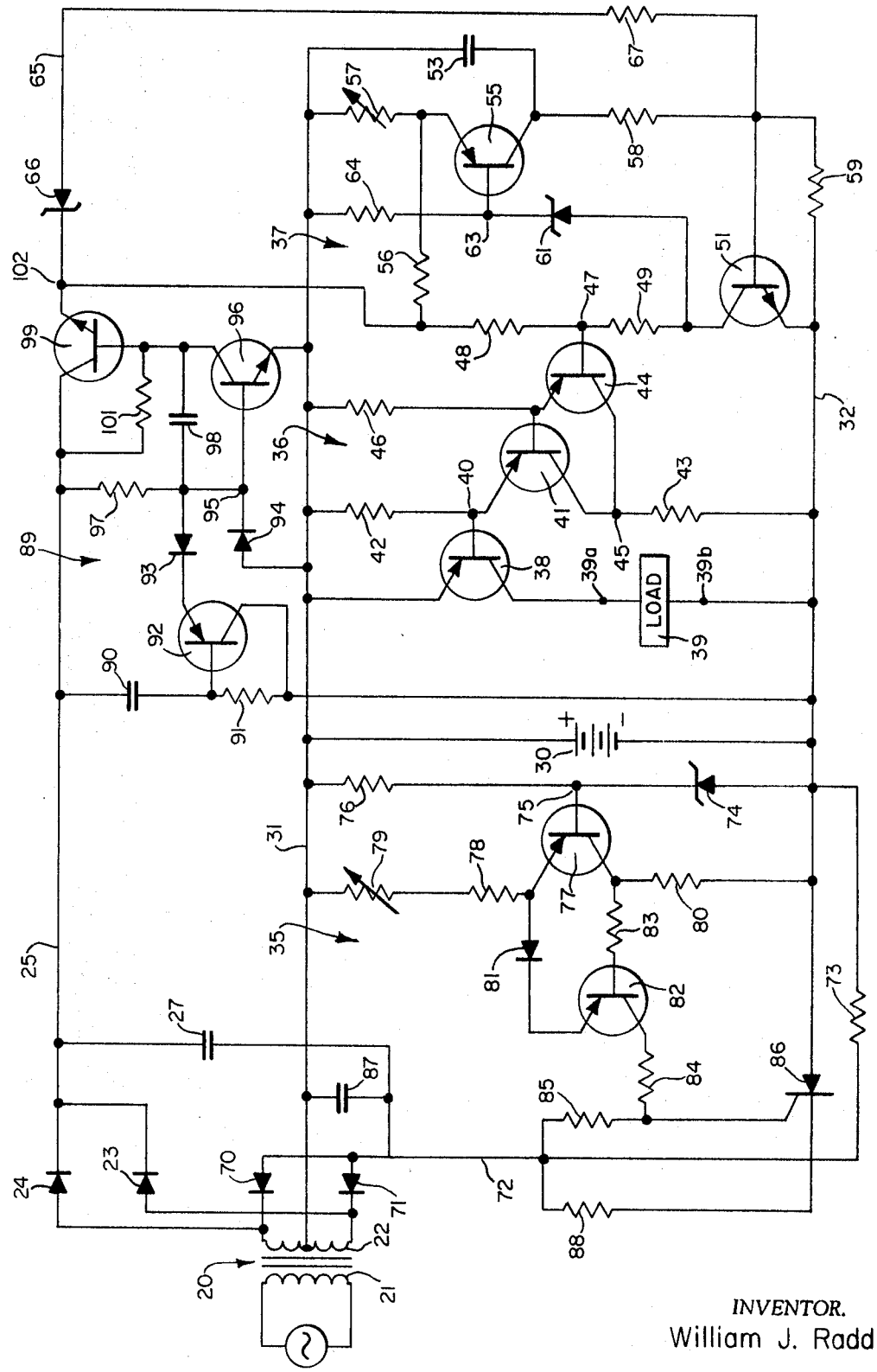
FIG. 2 is a schematic of an alternate form of the circuit.

In FIG. 2 there is shown an alternative circuit of this invention having a delay-on timer connected between the rectifier and the point 102. The delay-on timer is useful in those applications where it is desired to keep the emergency lights lit for a period of time after restoration of the AC power source. An example of such an application is where mercury vapor lamps are used in a building. Such lamps require a warmup period and therefore it is desirable that the emergency lamps remain on during this time. The duration of the time delay is governed by the time constant of the series circuit of capacitor 90 and resistor 91 wherein the capacitor is connected to the output line 25 of the rectifier and to the common conductor 32 through resistor 91. A PNP transistor is shown at 92 and has its base and collector tied to either side of resistor 91. Just after power restoration, capacitor 90 has zero potential across it and the base of 92 is at the potential of line 25 which in turn causes a reverse bias on diode 93 which has its cathode connected to the emitter of transistor 92. A second diode 94 has its anode connected to the busline 31 and its cathode tied to the junction point 95 which is directly connected to the base of NPN transistor 96. The point 95 is connected to the rectifier output 25 via resistor 97 with the anode of diode 93 and one side of capacitor 98 both coupled to the conductive path shown between point 95 and resistor 97. The emitter of 96 is tied to the common busline 31.

As shown in FIG. 2 an NPN transistor 99 has its collector joined to the rectifier output line 25. The emitter of 99 is connected to point 102 which in turn is tied to the cathode of zener diode 66 and to resistors 48 and 56. Bias resistor 101 is joined to the collector and the base of transistor 99, the base of which in turn is connected to the collector of transistor 99 and to filter capacitor 98. Transistor 99 is an emitter follower so that when transistor 96 is conducting the emitter of transistor 99 is at the same potential as busline 31 and therefore no current flows through transistor 99.

The timer circuit works in the following manner: immediately upon resumption of AC power, current is flowing through resistor 97 which turns on transistor 96 so that transistor 99 is rendered nonconducting and therefore a signal indicating return of AC power is not supplied to the switch 36 and the dropout circuit 37. As the potential across capacitor 90 builds, the reverse bias on diode 93 lessens until a point is reached at which transistor 92 conducts. As a result, current is then drawn through diodes 93 and 94 and away from the base of transistor 96 causing that transistor to cease conducting. Bias current is supplied through resistor 101 to the base of transistor 99 and that emitter follower "follows" transistor 96 and conducts when 96 ceases to conduct. Once transistor 99 conducts, the current signalling the switch to turn off appears across resistor 48 and the switch goes off. If prior to AC restoration the dropout circuit had caused to the switch to go off by assuming its nonconductive state, the dropout circuit would be reset to its conductive state by the current signal.

A modification of the delay-on timer involves substituting a silicon controlled rectifier (SCR) for transistor 99 wherein the gate of the SCR would be tied to the resistor 101 as is the base of transistor 101 and the anode of the SCR would be connected to point 102 and the cathode tied on line 25.

EXAMPLE I

In the following example, there are given the values of the various components of the circuit shown in FIG. 1 wherein it is presumed that a 6-volt battery is used and the rectified potential from the stepdown transformer is approximately 10 volts.

Resistors

| Number | Ohms |
|---|---|
| 42 | 22 |
| 43 | 7.5 |
| 46 | 2.2K |
| 48 | 1.0K |
| 49 | 1.0K |
| 56 | 4.7K |
| 57 | 1.0K |
| 58 | 1.0K |
| 59 | 1.0K |
| 64 | 1.0K |
| 67 | 150 |
| 73 | 71.5 |
| 76 | 270 |
| 78 | 33 |
| 79 | 0.50 |
| 83 | 820 |
| 84 | 300 |
| 85 | 1K |
| 88 | 1 |

Transistors

| Number | Designation |
|---|---|
| 38 | 2N1557 |
| 41 | 2N4919 |
| 44 | 2N4125 |
| 51 | 2N4123 |
| 55 | 2N4125 |
| 77 | 2N4125 |
| 82 | 2N4125 |

Diodes

| Number | Designation |
|---|---|
| 23 | 1N4001 |
| 24 | 1N4001 |
| 61 | SZ3.7, 1% |
| 66 | SZ15.0, 5% |
| 70 | 1N4719R |
| 71 | 1N4719R |
| 74 | SZ87, 5.0, 2% |
| 81 | 1N4454 |

All capacitors are 10 mfd., 25 VDC and the silicon controlled rectifier 86 is a 2N4442.

An important feature of the low-level dropout circuit is the fact that the choice of the zener diode determined at one point the circuit will drop out. Therefore, as shown in the above list of components, the zener diode used in the example has a potential drop across it of approximately 3 volts and as a result, when the battery potential drops to approximately 4½ volts, the bistable multivibrator will snap into the nonconductive state and can cause the basic switch to turn off. With the choice of another zener diode, the potential at which the bistable circuit snaps into the nonconductive state can be varied. This circuit has been found to be quite reliable in practice and can be quite useful in emergency power systems.

EXAMPLE II

In the following list are shown the values for the components used in the delay-on timer shown in FIG. 2 and as incorporated in the basic circuit of FIG. 1.

Resistors

| Number | Ohms |
|---|---|
| 91 | 470K |
| 97 | 10 Meg. |
| 101 | 10K |

Transistors

| Number | Designation |
|---|---|
| 92 | 2N3248 |
| 96 | 2N1306 |
| 99 | 2N388A |

Diode

| Number | Designation |
|---|---|
| 93 | 1N456 |
| 94 | 1N456 |

Capacitors

| Number | Designation |
|---|---|
| 90 | 10 mfd. |
| 98 | 0.1 mfd. |

With a delay-on timer circuit using the components listed above, there is provided a nominal 2 minute delay between restoration of power and extinguishment of the lamp. This is certainly sufficient time to permit mercury lamps or other similar electrical apparatus requiring a period to warm up to do so.

This invention therefore provides a reliable, and efficient circuit to be provided in emergency power systems wherein a storage battery is used to supply energy upon failure of an external supply of electricity. While the description of the preferred embodiment has related in particular to those applications involving involving emergency lighting systems, it is understood that this circuit could be used in other similar applications. This fully solid-state circuit has several advantages along with the fact of reliability including rapid switching between on and off states and providing means for protecting the battery from over discharge as well as providing a means for delaying the signal to turn the switch off when that feature is desired. It is clearly not intended to limit the scope of this invention to the embodiment described in detail herein but rather all reasonable modifications to this circuit embodied in the spirit of this invention are also envisioned and included.

What I claim is:

1. An emergency power supply circuit to be used in conjunction with an AC source of electricity wherein said circuit supplies energy to a load from a battery when said AC source fails and comprises in combination:

input means connected to said AC source and having rectifying means, a switch connected to said rectifying means, to said battery and to said load and being adapted to complete a current path between said battery and said load upon loss of AC power, said switch comprising a power transistor and a pair of transistors coupled together as an amplifier, a bistable multivibrator dropout connected to said rectifying means, to said battery to said switch, said bistable multivibrator being adapted to protect said battery from over discharge when AC power is off by causing said switch to disconnect said battery from said load, when the battery potential decreases to a certain value, and a charge controller connected to said input means and across said battery, said controller being adapted to monitor continually the charge on said battery and to charge said battery using said AC power as an energy source when the battery potential drops below a reference value, said charge controller comprising in combination, a pair of transistors arranged as a trigger comprising a first transistor and a second transistor, a current path comprising a resistor and a zener diode and connected across the terminals of said battery, said first transistor having its base connected to said resistor and biased thereby, said first transistor being biased on when said battery is in a charged state and being reversed biased when said battery is discharged a certain amount, said second transistor being biased on when said first transistor is reversed biased and vice versa, a silicon controlled rectifier connected in series with said battery and having its gate connected through a biasing means to the collector of said second transistor, said silicon controlled rectifier being adapted to supply a high rate charging current to said battery from said AC source when said second transistor is conducting, and a trickle resistor connected in series with said battery and adapted to supply a trickle charging current to said battery from said AC source when said first transistor is conducting.

2. An emergency power supply circuit for use in conjunction with a separate power source to supply direct current to a load from a battery upon failure of said separate power source and comprising in combination:

a rectifier input means adapted to be connected to said separate power source;

an output means adapted to be connected to said load;

a switch connected to said battery and adapted to complete a current path between said battery and said output means upon failure of said separate power source and to disconnect said battery from said load upon restoration of said separate power source;

said switch comprising a power transistor and an amplifier comprising a pair of transistors;

a bistable multivibrator connected to said switch and to said battery and adapted to cause said switch to disconnect said battery from said load when the battery voltage reaches a certain level; SAID BISTABLE MULTIVIBRATOR HAVING A VOLTAGE SENSING MEANS IN THE FEEDBACK PATH THERE OF AND adapted TO EXIST IN A FIRST STATE WHENEVER SAID SEPARATE POWER SOURCE IS ON AND IN A SECOND STATEE WHEN SAID SEPARATE POWER SOURCE IS OFF AND THE BATTERY VOLTAGE HAS REACHED A CERTAIN LEVEL AND REMAIN IN SAID SECOND STATE UNTIL SAID SEPARATE POWER SOURCE IS RESTORED: AND, resetting means to reset said bistable multivibrator from said second state to said first state.

3. The circuit of claim 2 in which said voltage sensing means in said bistable multivibrator is a zener diode.

4. The circuit of claim 2 wherein said bistable multivibrator comprises a first transistor and a second transistor regeneratively coupled to each other and said resetting means comprises a resistor connecting said circuit input means to the emitter of said first transistor.

5. The circuit of claim 2 wherein said bistable multivibrator comprises a first transistor and a second transistor regeneratively coupled to each other and said resetting means comprises a series current path of a zener diode and a resistor, said current path being connected at one end of said input means and at the other end to the base of said second transistor.

6. A circuit for an emergency power supply wherein electrical energy is supplied from a battery to a load upon failure of an AC source of power, said circuit comprising in combination:
  input means adapted to be connected to said AC power source;
  a delay-on timer connected to said input means and having an output means;
  a switch connected to said timer output means and to said battery and adapted to connect said battery to said load upon loss of AC power;
  a bistable multivibrator dropout means connected to said timer output means and to said battery and to said switch;
  said dropout means having a voltage sensing means and adapted to protect said battery against over discharge by causing said switch to disconnect said battery from said load when said battery is discharged to a certain potential;
  said dropout means adapted to exist in a first state when said AC power is on and to exist in a second state when said AC power is off and said battery has discharged to said certain potential; and,
  resetting means connected to said timer output means and adapted to reset said dropout means from said second state to said first state upon restoration of said AC power;
  said timer adapted to delay for a period of time a signal indicating restoration of said AC power from appearing at said timer output.

7. A circuit of claim 6 wherein said timer comprises a series current path comprising a capacitor and a resistor, said current path being connected to said input means, a first transistor connected to said current path and adapted to be biased thereby, a second transistor connected to said input means and to said first transistor and adapted to be biased first by said input means and second by said first transistor, and a third transistor connected to said timer output and to said second transistor as an emitter-follower whereby said second transistor conducts upon restoration of said AC power and ceases to conduct upon conduction by said first transistor, and said third transistor being nonconductive when said second transistor is conducting and being conductive when said second transistor is nonconducting.

8. A circuit of claim 6 wherein said bistable multivibrator comprises a pair of transistors regeneratively coupled to each other and said voltage sensing means in the feedback path of said bistable multivibrator is a zener diode.

9. A circuit of claim 6 wherein said bistable multivibrator drop out compromises a first transistor and a second transistor regeneratively coupled to each other and said resetting means comprises a resistor connected between said timer output and the emitter of said first transistor.

10. A circuit of claim 6 wherein said bistable multivibrator comprises a first transistor and a second transistor regeneratively coupled to each other and said resetting means comprises a series current path comprising a zener diode and a resistor, said current path connected between said timer output and the base of said second transistor.

11. A circuit of claim 7 wherein a silicon controlled rectifier is substituted for said third transistor and is adapted to be nonconductive when said second transistor is conducting and to be triggered into conduction when said second transistor ceases to conduct.

12. A direct current emergency power supply for use in emergency lighting systems and the like in conjunction with an AC power source and a battery, comprising in combination:
  an input adapted to be connected to said AC power source;
  a rectifier connected to said input means;
  an output means adapted to be connected to a load, such as a lamp or the like;
  a solid-state switch comprising a power transistor and a pair of transistors coupled to each other as a darlington amplifier, said switch being connected to said battery and to said output means and being adapted to connect said battery to said output means upon failure of said AC power source;
  a solid-state, bistable multivibrator dropout comprising a first transistor and a second transistor and having a zener diode in the feedback path thereof, said dropout being connected to said battery and to said switch and being adapted to exist in one of two states, a conductive state and a nonconductive state, said dropout existing in said conductive state whenever said AC power source is on and existing in said nonconductive state when said AC power source is off and the potential of said battery has dropped to a certain level, said dropout being adapted to remain in said nonconductive state until restoration of said AC power source, said dropout being adapted to cause said switch to disconnect said battery from said output means when said battery potential drops to a certain level and thereby protect said battery against overdischarge;
  resetting means for resetting said dropout from said nonconductive state to said conductive state upon restoration of said AC power source;
  a delay-on timer having an input means connected to said rectifier and an output means connected to said resetting means and to said switch, said input means comprising a current path comprising a capacitor, and a resistor connected in series, a first transistor tied to said current path and biased thereby, a second transistor adapted to conduct upon restoration of said AC power and to cease conducting when said first transistor conducts, and a third transistor connected as an emitter follower to said second transistor and adapted to conduct when said second transistor ceases to conduct and thereby supply current to said timer output means; and,
  a charge controller connected to said input means and across said battery, said controller adapted to continually monitor the charge on said battery and to supply charging current thereto, said charge controller comprising a first transistor and a second transistor regeneratively coupled to each other as a trigger, said trigger having an input means and an output means, a current path comprising a bias resistor and a reference zener diode, said trigger input means connected to said bias resistor for biasing said first transistor,
  a silicon controlled rectifier connected in series with said battery and having its gate connected to said switch output means, said silicon controlled rectifier being triggered into conduction upon a current flow in said switch output means.

13. A power supply of claim 12 wherein said resetting means comprises a resistor connected to said timer output and to the emitter of said first transistor of said dropout.

14. A power supply of claim 12 wherein said resetting means comprises a current path connected to said timer output and to the base of said second transistor of said dropout, said current path comprising a resistor and a zener diode.